(12) United States Patent
Wang et al.

(10) Patent No.: US 7,801,968 B2
(45) Date of Patent: Sep. 21, 2010

(54) DELEGATED PRESENCE FOR UNIFIED MESSAGING/UNIFIED COMMUNICATION

(75) Inventors: Kuansan Wang, Bellevue, WA (US); Xuedong D. Huang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 11/119,346

(22) Filed: Apr. 29, 2005

(65) Prior Publication Data

US 2006/0245434 A1 Nov. 2, 2006

(51) Int. Cl.
*H04L 12/66* (2006.01)
(52) U.S. Cl. .................... 709/217; 709/206
(58) Field of Classification Search ............... 709/217, 709/206; 707/4
See application file for complete search history.

(56) References Cited

U.S. PATENT DOCUMENTS

| | | | |
|---|---|---|---|
| 6,243,670 B1 * | 6/2001 | Bessho et al. ................... 704/9 |
| 6,819,663 B2 * | 11/2004 | Komuro ..................... 370/352 |
| 6,823,370 B1 * | 11/2004 | Kredo et al. ................ 709/206 |
| 6,910,072 B2 * | 6/2005 | Macleod Beck et al. .... 709/224 |
| 7,007,067 B1 * | 2/2006 | Azvine et al. ............... 709/206 |
| 7,072,838 B1 * | 7/2006 | Ghosh et al. ................ 704/257 |
| 2005/0240659 A1 * | 10/2005 | Taylor ........................ 709/217 |
| 2006/0077956 A1 * | 4/2006 | Saksena et al. ............ 370/352 |
| 2006/0117098 A1 * | 6/2006 | Dezonno et al. ............ 709/223 |

OTHER PUBLICATIONS

Daniel Horn, the importance of an all in one communication adapter in a unified communication solution, 2003, Eicon Network, www.eicom.com, 8 pages.*
Daniel Horn, the importance of an all in one communication adapter in a unified communication solution, 2003, Eicon Network, U www.eicom.com, 8 pages.*
"Using the RTC Client API" (Real-time Communications (RTC) Client Technical Articles) Nov. 2003, 28 pages, http://msdn.microsoft.com/library/en-us/dnrtcclnt/html/usertcclnt.asp?frame=true.
"Live Communications Server 2005 Public IM Connectivity Overview" Published Mar. 8, 2005, http://www.microsoft.com/office/livecomm/prodinfo/publicim.mspx?pf=true, 2 pages.
CMP United Business Media, "Opinion: The Future Of IM Is Presence" Oct. 22, 2004, http://www.messagingpipeline.com/shared/srticle/printableArticleSrc.jhtml?articleId=510003... 3 pages.
By Daniela Horn, 2003: "The Importance of an All-in-One Communication Adapter in a Unified Communications Solution" Eicon Networks. www.eicon.com, 8 pages.
K. Singh and H. Schulzrinne: "Peer-to-Peer Internet telephony using SIP" Department of Computer Science, Columbia University, Sep. 2004.

* cited by examiner

*Primary Examiner*—Jeffrey Pwu
*Assistant Examiner*—Sulaiman Nooristany
(74) *Attorney, Agent, or Firm*—Joseph R. Kelly; Westman, Champlin & Kelly, P.A.

(57) ABSTRACT

The present invention relates to methods and systems for handling interactions between a user and a computer. In particular, the present invention relates to methods and systems for handling communication messages from different types of communication interfaces.

10 Claims, 5 Drawing Sheets

US 7,801,968 B2

DELEGATED PRESENCE FOR UNIFIED MESSAGING/UNIFIED COMMUNICATION

BACKGROUND OF THE INVENTION

The present invention relates to methods and systems for handling interactions between a user and a computer. In particular, the present invention relates to methods and systems for handling communication messages from different types of communication interfaces.

Modern telecommunications systems generally utilize two domains, a Public Switch Telephone Network (PSTN) domain and an Internet Domain. In the PSTN domain, one has the choice of regular phone calls, text and multimedia messages (SMS/MMS), fax, and interactive voice response (IVR) for automatic self service. This domain uses what is known as circuit switching technology. In the Internet domain, email, instant messaging (IM), web sites and blogging are among the commonly used methods for communications. This domain uses what is known as packet switching technology.

Although technologies exist to allow users to send communication messages between the two domains, integration between the two domain remains challenging and inconvenient for ordinary users. Additionally, even within the same domain, users are usually confronted with separate tools for accessing communication messages. For example, users may need to access multiple voicemail boxes for mobile and office phones, or enterprise and internet hosted email inboxes. Also, a person may need to try several phone numbers and other modes of communication to contact another person or to contact a group. Thus, there is a need for a convenient mechanism that handles various types of communication requests and messages.

SUMMARY OF THE INVENTION

The present invention relates to handling communication messages in a communication architecture. In one aspect, a method is provided that includes receiving a communication message and analyzing the communication message to identify semantic information contained therein. One or more tasks are automatically performed based on the communication message and the semantic information.

In another aspect, a method of processing communication connections includes receiving a communication request from a communication source. The source is an Internet protocol source or a plain old telephone system (POTS) protocol source. The method includes providing a bridge at a computer in a peer-to-peer networking environment from an Internet protocol to a POTS protocol and from a POTS protocol to an Internet protocol. The communication request is routed from the communication source to a communication destination. The destination is an Internet protocol destination or a POTS destination and is different from the communication source.

Yet another aspect of the present invention relates to a method of handling communication messages for plurality of users. A communication request is received and routed to one of the plurality of users based on the communication request.

DETAILED DESCRIPTION OF ILLUSTRATIVE EMBODIMENTS

Before describing an agent for handling communication messages and methods for implementing the same, it may be useful to describe generally computing devices that can function in a communication architecture. These devices can be used in various computing settings to utilize the agent across a computer network. For example, the devices can interact with the agent using natural language input of different modalities including text and speech. The devices discussed below are exemplary only and are not intended to limit the present invention described herein.

Figure 1:
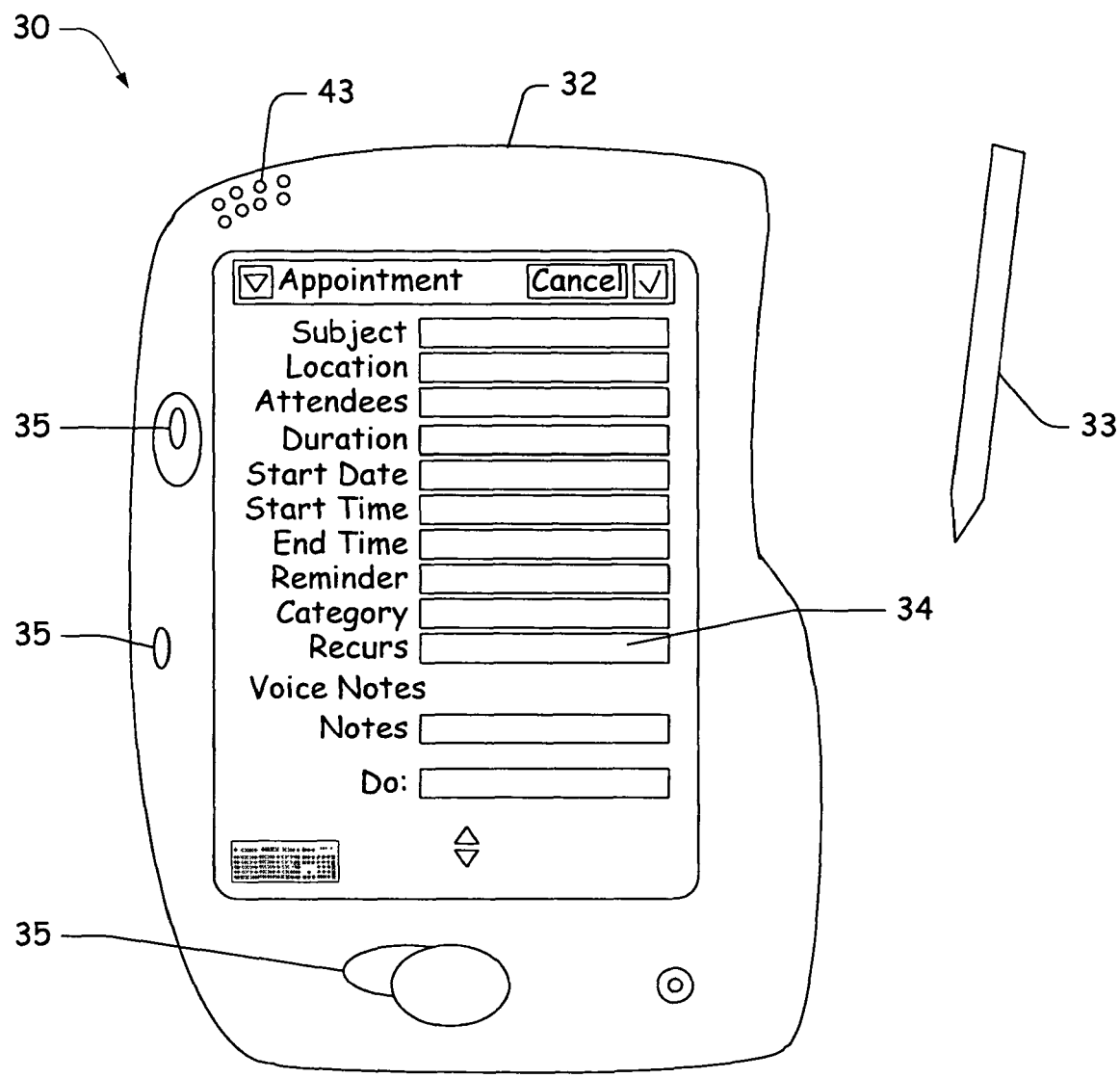
FIGS. 1-4 illustrate exemplary computing devices for use with the present invention.

An exemplary form of a data management mobile device 30 is illustrated in FIG. 1. The mobile device 30 includes a housing 32 and has a user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. Another form of input can include a visual input such as through computer vision.

Figure 2:
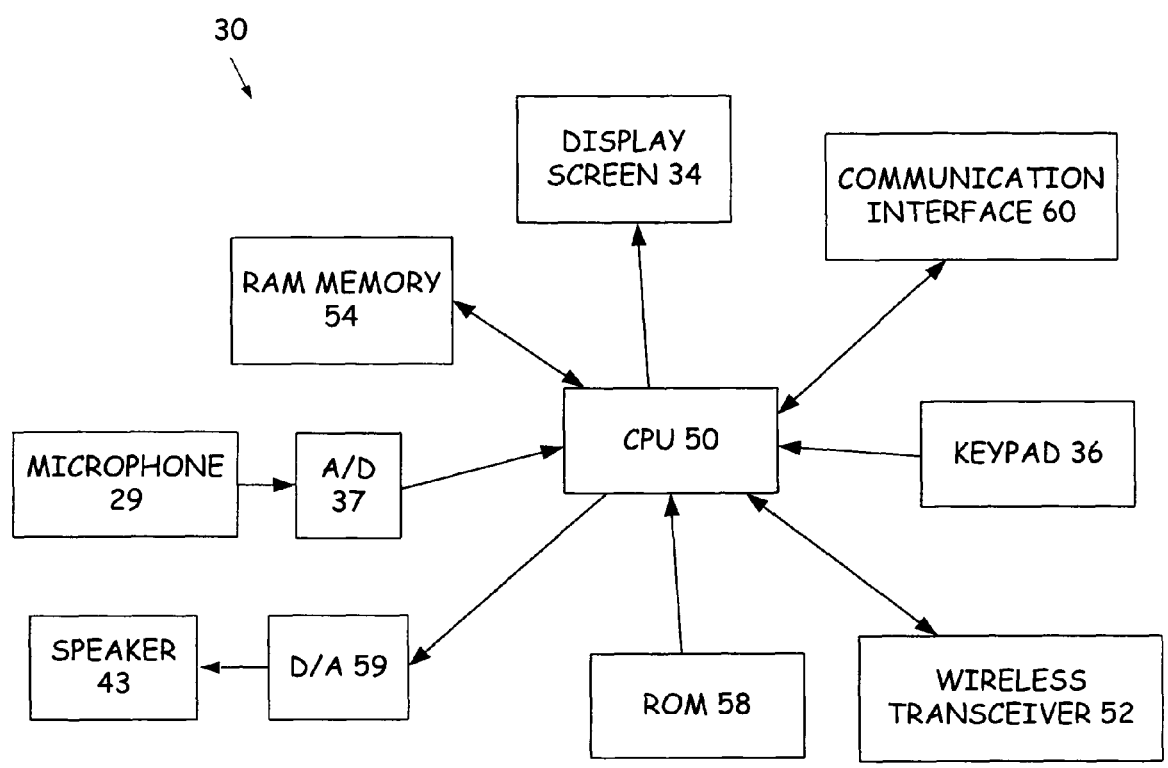

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile device 30 and other operating system kernel functions (e.g., the loading of software components into RAM 54).

RAM 54 also serves as storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, an analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results.

Using wireless transceiver 52 or communication interface 60, speech and other data can be transmitted remotely, for example to an agent. When transmitting speech data, a remote speech server can be utilized. Recognition results can be returned to mobile device 30 for rendering (e.g. visual and/or audible) thereon, and eventual transmission to the agent, wherein the agent and mobile device 30 interact based on communication messages.

Similar processing can be used for other forms of input. For example, handwriting input can be digitized with or without pre-processing on device 30. Like the speech data, this form of input can be transmitted to a server for recognition wherein the recognition results are returned to at least one of the device 30 and/or a remote agent. Likewise, DTMF data, gesture data and visual data can be processed similarly. Depending on the form of input, device 30 (and the other forms of clients discussed below) would include necessary hardware such as a camera for visual input.

Figure 3:
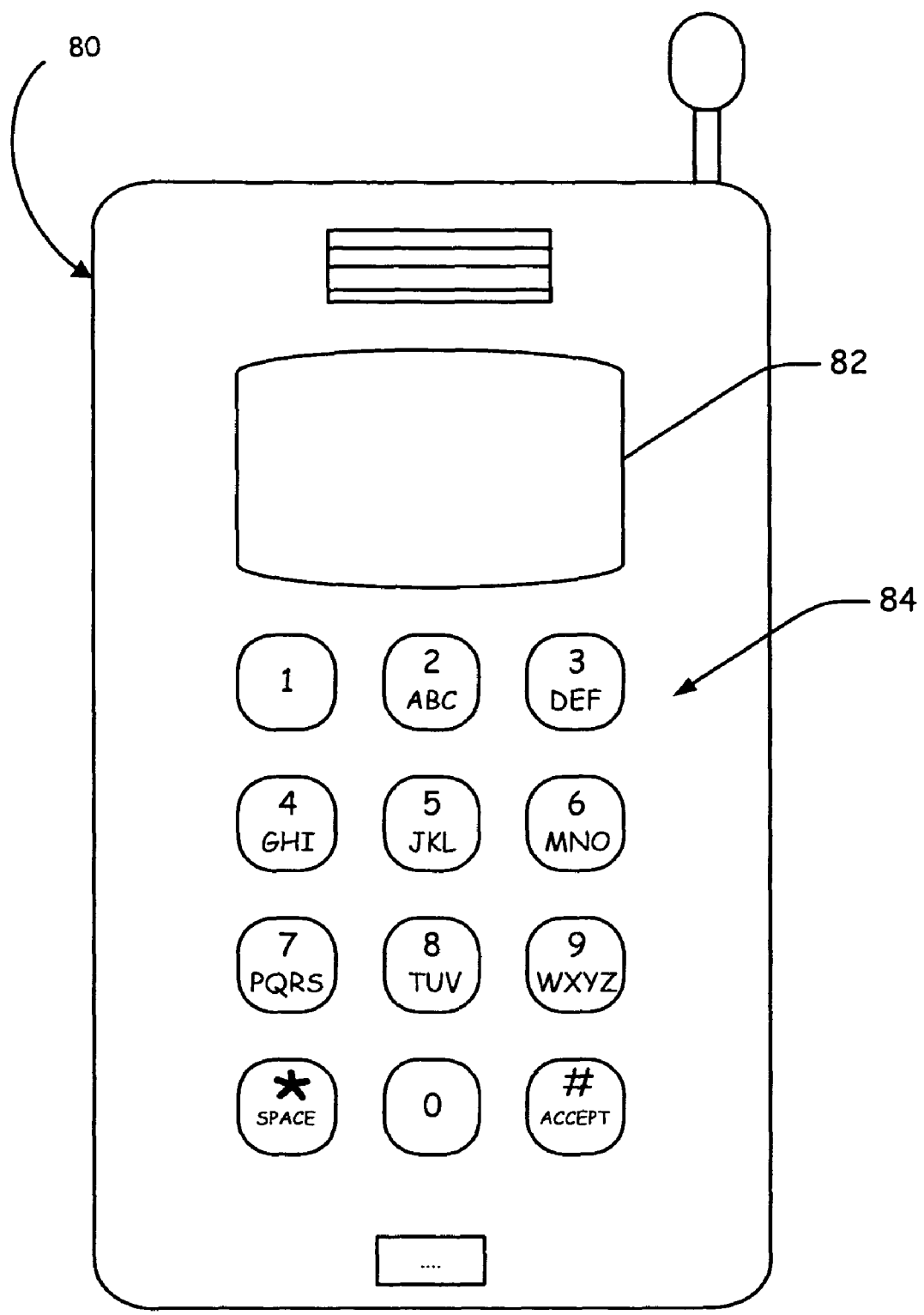

FIG. 3 is a plan view of an exemplary embodiment of a portable phone 80. The phone 80 includes a display 82 and a keypad 84. Generally, the block diagram of FIG. 2 applies to the phone of FIG. 3, although additional circuitry necessary to perform other functions may be required. For instance, a transceiver necessary to operate as a phone will be required for the embodiment of FIG. 2; however, such circuitry is not pertinent to the present invention.

The agent is also operational with numerous other general purpose or special purpose computing systems, environments or configurations. Examples of well known computing systems, environments, and/or configurations that may be suitable for use with the invention include, but are not limited to, regular telephones (without any screen), personal computers, server computers, hand-held or laptop devices, multiprocessor systems, microprocessor-based systems, set top boxes, programmable consumer electronics, radio frequency identification (RFID) devices, network PCs, minicomputers, mainframe computers, distributed computing environments that include any of the above systems or devices, and the like.

Figure 4:
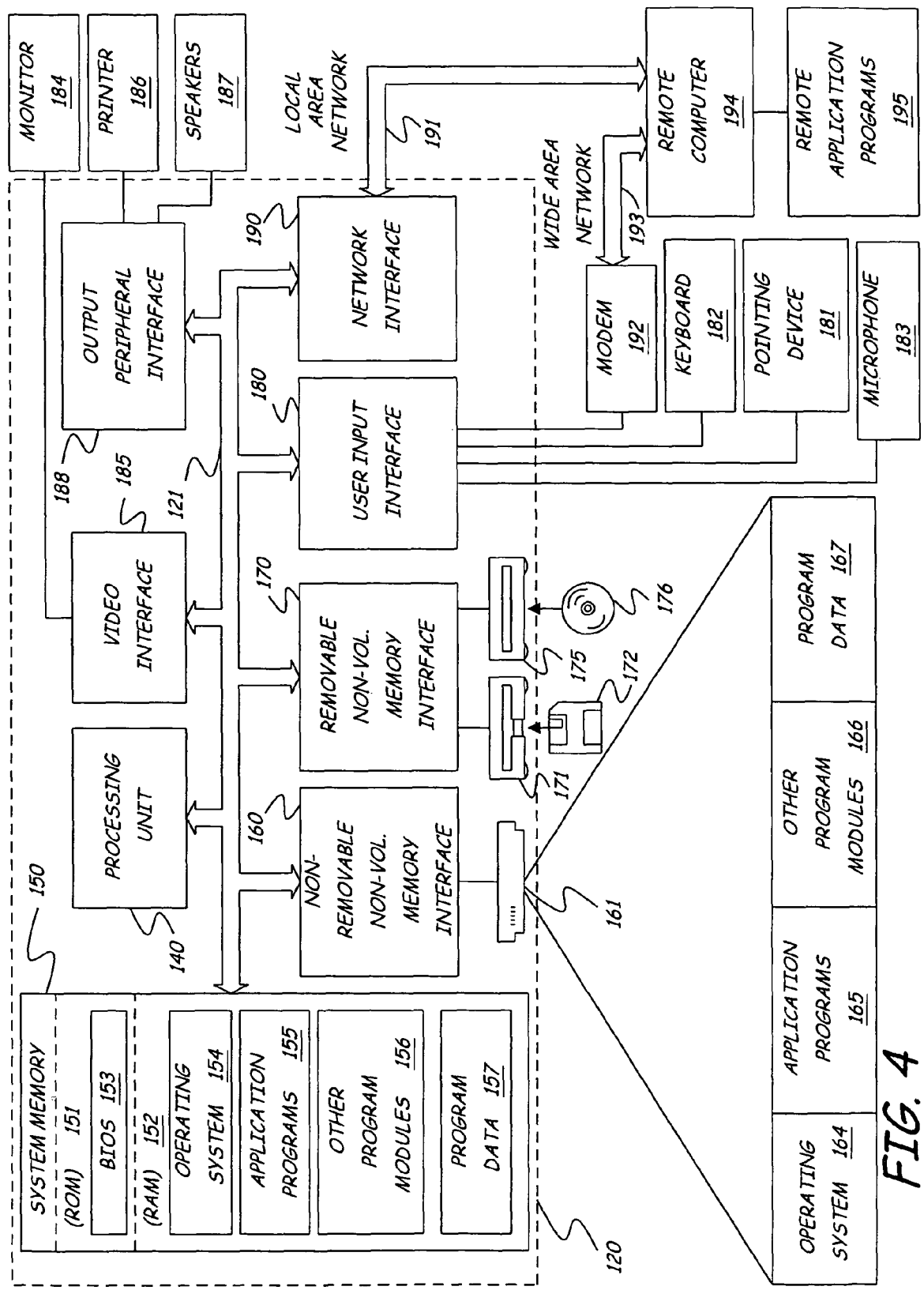

The following is a brief description of a general purpose computer 120 illustrated in FIG. 4. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 4, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 4 illustrates operating system 54, application programs 155, other program modules 156, and program data 157.

The computer 120 may also include other removable/non-removable volatile/nonvolatile computer storage media. By way of example only, FIG. 4 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 4, provide storage of computer readable instructions, data structures, program modules and other data for the computer 120. In FIG. 4, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 4 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 4 illustrates remote application programs 195 as residing on remote computer 194. It will be appreciated that the network connections shown are exemplary and other means of establishing a communications link between the computers may be used.

Typically, application programs 155 have interacted with a user through a command line or a Graphical User Interface (GUI) through user input interface 180. However, in an effort to simplify and expand the use of computer systems, inputs have been developed which are capable of receiving natural language input from the user. In contrast to natural language or speech, a graphical user interface is precise. A well designed graphical user interface usually does not produce ambiguous references or require the underlying application to confirm a particular interpretation of the input received through the interface 180. For example, because the interface is precise, there is typically no requirement that the user be queried further regarding the input, e.g., "Did you click on the 'ok' button?" Typically, an object model designed for a graphical user interface is very mechanical and rigid in its implementation.

In contrast to an input from a graphical user interface, a natural language query or command will frequently translate into not just one, but a series of function calls to the input object model. In contrast to the rigid, mechanical limitations of a traditional line input or graphical user interface, natural language is a communication means in which human interlocutors rely on each other's intelligence, often unconsciously, to resolve ambiguities. In fact, natural language is regarded as "natural" exactly because it is not mechanical. Human interlocutors can resolve ambiguities based upon contextual information and cues regarding any number of domains surrounding the utterance. With human interlocutors, the sentence, "Forward the minutes to those in the review meeting on Friday" is a perfectly understandable sentence without any further explanations. However, from the mechanical point of view of a machine, specific details must be specified such as exactly what document and which meeting are being referred to, and exactly to whom the document should be sent.

Figure 5:
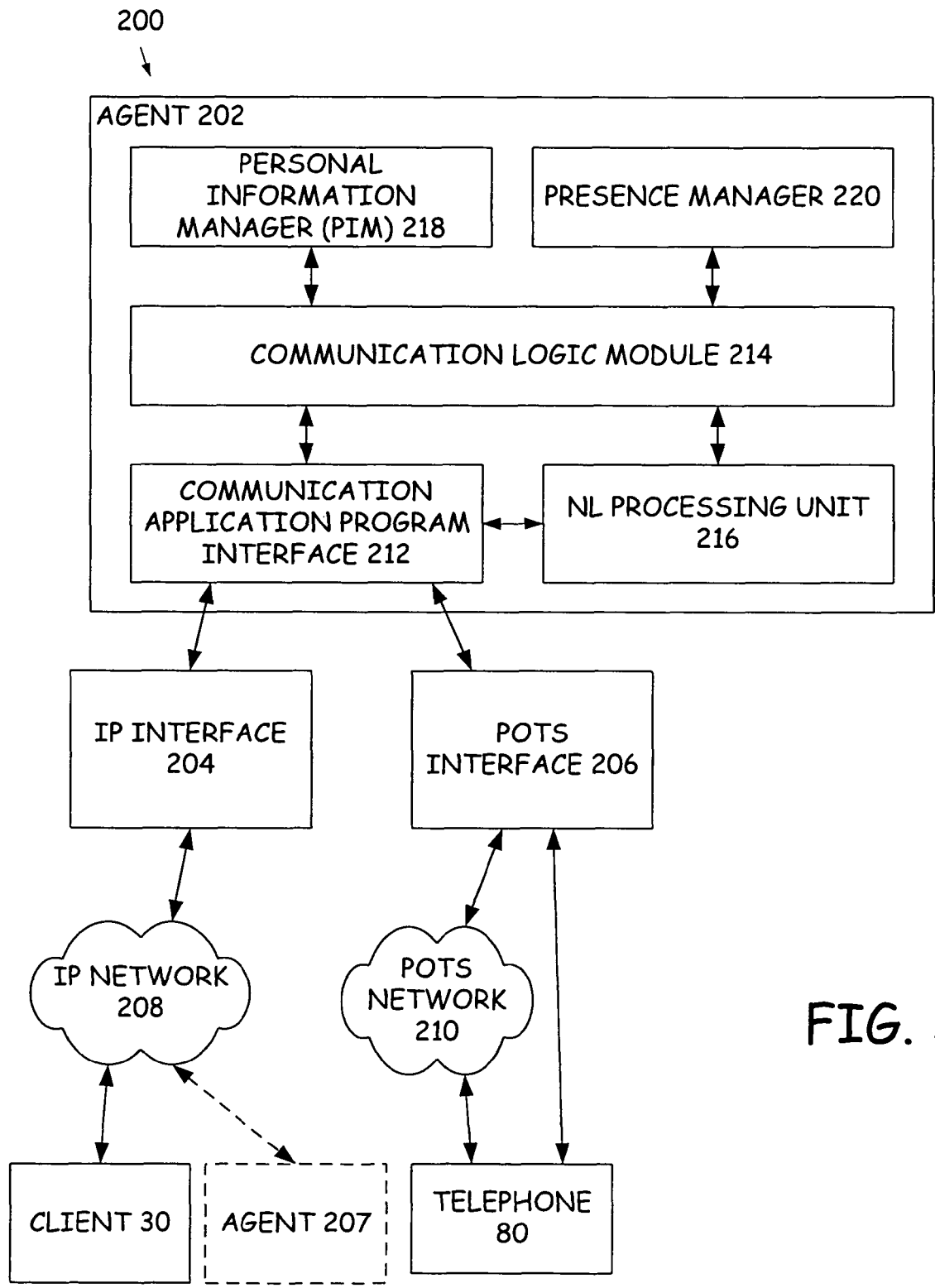
FIG. 5 illustrates an exemplary agent for handling communication messages.

FIG. 5 illustrates an exemplary communication architecture 200 with an agent 202 as discussed above. Agent 202 receives communication requests and messages from an initiator and performs tasks based on the requests and messages. The messages can be routed to a destination. An initiator can include a person, another agent, a device, a telephone, a remote personal information manager, etc. that connects to agent 202. The messages from the initiator can take many forms including real time voice (for example from a simple telephone or through a voice over Internet protocol source), real time text (such as instant messaging), non-real time voice (for example a voicemail message) and non-real time text (for example through short message service (SMS) or email). Tasks are automatically performed by agent 202, for example speech recognition, scheduling a calendar, voice dialing, call routing and interpreting a caller identification. Destinations can include a phone, a voicemail box, instant messaging client and another agent.

In one embodiment, agent 202 can be implemented on a general purpose computer such as computer 120 discussed above. Agent 202 represents a single point of contact for a user or a group of users. Thus, if a person wishes to contact the user or group of users associated with agent 202, communication requests and messages are passed through agent 202. In this manner, the person need not have all contact information for the user or group of users. The person only needs to contact agent 202, which handles and routes incoming communication requests and messages. Additionally, agent 202 is capable of initiating a dialog with the person, if the user or group of users is unavailable.

An initiator of a communication request or message can contact agent 202 through a number of a different modes of communication. Generally, agent 202 can be accessed through mobile device 30 (which herein also represents other forms of computing devices having a display screen, a microphone, a camera, a touch sensitive panel, etc., as required based on the form of input), or through phone 80 wherein communication is made audibly or through tones generated by phone 80 in response to keys depressed and wherein information from agent 202 can be provided audibly back to the user.

More importantly though, agent 202 is unified in that whether information is obtained through device 30 or phone 80, agent 202 can support either mode of operation. Agent 202 is operably coupled to multiple interfaces to receive communication messages. IP interface 204 receives information using packet switching technologies, for example using TCP/IP. POTS (Plain Old Telephone System, also referred to as Plain Old Telephone Service) interface 206 can interface with any type of circuit switching system including a Public Switch Telephone Network (PSTN), a private network (for example a corporate Private Branch Exchange (PBX)) and/or combinations thereof. Thus, POTS interface 206 can include an FXO (Foreign Exchange Office) interface and an FXS (Foreign Exchange Station) interface for receiving information using circuit switching technologies. IP interface 204 and POTS interface 206 can be embodied in a single device such as an analog telephony adapter (ATA). Other devices that can interface and transport audio data between a computer and a POTS can be used, such as "voice modems" that connect a POTS to a computer using a telephone application program interface (TAPI).

In this manner, agent 202 serves as a bridge between the Internet domain and the POTS domain. The bridge can be provided at an individual personal computer with a connection to the Internet. Additionally, agent 202 can operate in a peer-to-peer manner with any suitable device, for example client 30 and/or phone 80. Furthermore, agent 202 can communicate with one or more other agents (such as agent 207). As a result, the need for expensive centralized servers is reduced.

As illustrated in FIG. 5, device 30 and agent 202 are commonly connected, and separately addressable, through a network 208, herein a wide area network such as the Internet. It therefore is not necessary that client 30 and agent 202 be physically located adjacent each other. Client 30 can transmit data, for example speech, text and video data, using a specified protocol to IP interface 204. In one embodiment, communication between client 30 and IP interface 204 uses standardized protocols, for example SIP with RTP (Session Initiator Protocol with Realtime Transport Protocol), both Internet Engineering Task Force (IETF) standards.

Access to agent 202 through phone 80 includes connection of phone 80 to a wired or wireless telephone network 210 that, in turn, connects phone 80 to agent 202 through a FXO interface. Alternatively, phone 80 can directly connect to agent 202 through a FXS interface.

Both IP interface 204 and POTS interface 206 connect to agent 202 through a communication application program interface (API) 212. One implementation of communication API 212 is Microsoft Real-Time Communication (RTC) Client API, developed by Microsoft Corporation of Redmond, Wash. Another implementation of communication API 212 is the Computer Supported Telecommunication Architecture (ECMA-269/ISO 18051), or CSTA, an ISO/ECMA standard. Communication API 212 can facilitate multimodal communication applications, including applications for communication between two computers, between two phones and between a phone and a computer. Communication API 212 can also support audio and video calls, text-based messaging and application sharing. Thus, agent 202 is able to initiate communication to client 30 and/or phone 80. Alternatively, another agent 207 can be contacted by agent 202.

To unify communication control for POTS and IP networks, agent 202 is able to translate POTS protocols into corresponding IP protocols and vice versa. Some of the translations are straightforward. For example, agent 202 is able to translate an incoming phone call from POTS into an invite message (for example a SIP INVITE message) in the IP network, and a disconnect message (for example a SIP BYE message), which corresponds to disconnecting a phone call in POTS.

However, some of the IP-POTS translations involve multiple cohesive steps and are not obvious. For example, a phone call originated in POTS may reach the user on the IP network with agent 202 using an ATA connected to an analog phone line. The user may direct the agent 202 to transfer the communication to a third party reachable only through a POTS using a refer message (for example a SIP REFER message). The ATA fulfills the intent of the SIP REFER message using call transfer conventions for the analog telephone line. Often, call transfer on analog phone lines involves the following steps: (1) generating a hook flash, (2) waiting for a second dial tone, (3) dialing the phone number of the third party recipient, and (4) detecting the analog phone call connection status and generating corresponding SIP messages (e.g., a ringing connection in an analog phone corresponds to a REFER ACCEPTED and a busy tone to a REFER REJECTED, respectively).

Agent 202 also includes a communication logic module 214, a natural language processing unit 216, a personal information manager (PIM) 218 and a presence manager 220. Communication logic module 214 includes logic to handle communication requests and messages from communication API 212. This logic can perform several communication tasks including answering, routing and filtering calls, recording voice and video messages, analyzing and storing text messages, arranging calendars, schedules and contacts as well as facilitating individual and conference calls through both IP interface 204 and POTS interface 206.

Communication logic module 214 also can define a set of rules for which to contact a user and interact with users connecting to agent 202 via communication API 212. Rules that define how to contact a user are referred to as "Find Me/Follow Me" features for communication applications. For example, a user associated with agent 202 can identify a home phone number, an office phone number, a mobile phone number and an email address for which agent 202 can attempt to contact the user. Additionally, persons contacting agent 202 can have different priority settings such that, for certain persons, calls can always be routed to the user.

Communication logic module 214 utilizes natural language processing unit 216 to perform various natural language processing tasks. Natural language processing unit 216 includes a recognition engine that is used to identify features in the user input. Recognition features for speech are usually words in the spoken language while recognition features for handwriting usually correspond to strokes in the user's handwriting. In one particular example, a grammar can be used to recognize text within a speech utterance. As is known, recognition can also be provided for visual inputs.

Communication logic module 214 uses semantic objects recognized by natural language processing unit 216 to access information in PIM 218. As used herein, "semantic" refers to a meaning of natural language expressions. Semantic objects can define properties, methods and event handlers that correspond to the natural language expressions.

In one embodiment of the present invention, a semantic object provides one way of referring to an entity that can be utilized by communication logic module 214. A specific domain entity pertaining to a particular domain application can be identified by any number of different semantic objects with each one representing the same domain entity phrased in different ways.

The term semantic polymorphism can be used to mean that a specific entity may be identified by multiple semantic objects. The richness of the semantic objects, that is the number of semantic objects, their interrelationships and their complexity, corresponds to the level of user expressiveness that an application would enable in its natural language interface. As an example of polymorphism "John Doe", "VP of NISD", and "Jim's manager" all refer to the same person (John Doe) and are captured by different semantic objects PersonByName, PersonByJob, and PersonByRelationship, respectively.

Semantic objects can also be nested and interrelated to one another including recursive interrelations. In other words, a semantic object may have constituents that are themselves semantic objects. For example, "Jim's manager" corresponds to a semantic object having two constituents: "Jim" which is a "Person" semantic object and "Jim's Manager" which is a "PersonByRelationship" semantic object. These relationships are defined by a semantic schema that declares relationships among semantic objects. In one embodiment, the schema is represented as a parent-child hierarchical tree structure. For example, a "SendMail" semantic object can be a parent object having a "recipient" property referencing a particular person that can be stored in PIM 218. Two example child objects can be represented as a "PersonByName" object and a "PersonByRelationship" object that are used to identify a sender of a mail message from PIM 218.

The semantic objects may be extracted from a single user command or, if the human user is not specific, via a user dialog conducted by agent 202. For example, if the caller identification number (CallerID) does not provide a definitive identification for the caller, agent 202 may use a visual or spoken dialog to acquire the name and the phone number of the caller. In the case of a spoken dialog, a caller's utterance may be recorded alongside with a transcription obtained through automatic speech recognition. Agent 202 can then present the caller's information to the user in a structured and multimedia fashion.

For example, messages in different forms can be presented in a user friendly manner by presenting a structured representation to the user. The representation can include various semantic information that is useful to the user. Additionally, portions of the representation can include hyperlinks that provide a quick connection to a portion of a message or to a phone number, for example. One exemplary representation includes a table for a voicemail. The table can include entries related to important data about the voicemail message, such as a caller's name, return call number, subject, time, etc. These entries can include hyperlinks to corresponding audio in the voicemail message. For example, if the transcribed phone number appears incorrect, the user can click on the phone number or a corresponding icon to hear the audio that was transcribed to the phone number.

Using communication logic module 214, PIM 218 can be accessed based on actions to be performed and/or semantic objects. As appreciated by those skilled in the art, PIM 218 can include various types and structures of data that can manifest themselves in a number of forms such as, but not limited to, relational or objected oriented databases, Web Services, local or distributed programming modules or objects, XML documents or other data representation mechanism with or without annotations, etc. Specific examples include contacts, appointments, text and voice messages, journals and notes, audio files, video files, text files, databases, etc. Agent 202 can then provide an output using communication API 212 based on the data in PIM 218 and actions performed by communication logic module 214.

PIM 218 can also include an indication of priority settings for particular contacts. The priority settings can include several levels of rules that define how to handle communication messages from a particular contact. For example, one contact can have a high priority (or VIP) setting in which requests and/or messages are always immediately forwarded to the user associated with agent 202. Contacts with a medium priority setting will take a message from the contact if the user is busy and forward an indication of a message received to the user. Contacts with a low setting will have messages taken that can be access by the user at a later time. In any event, numerous settings and rules for a user's contacts can be set within PIM 218, which are not limited to the situations discussed above.

Presence manager 220 includes an indicator of a user's availability. For example, a presence indicator can be "available", "busy", "stepped out", "be right back", "on the phone", or "offline". Presence manager 220 can interact with communication logic module 214 to handle communication messages based on the indicator. In addition to the presence indicators identified above, presence manager 220 also includes a presence referred to as "delegated presence".

When presence manager 220 indicates that presence is delegated, agent 202 serves as an automatic message handler for a user or group of users. Agent 202 can automatically interact with persons wishing to contact the user or group of users associated with agent 202. For example, agent 202 can route an incoming call to a user's cell phone, or prompt a person to leave a voicemail message. Alternatively, agent 202 can arrange a meeting with a person based on information contained in a calendar of the PIM 218. When agent 202 is associated with a group of users, agent 202 can route a communication request in a number of different ways. For example, the request can be routed based on a caller identification of a person, based on a dialog with the person or otherwise. Below are several usage scenarios for agent 202 when the presence is delegated.

In one scenario, Alice wishes to communicate with Bob about a particular matter. Alice has a buddy list that shows that Bob's presence is delegated. To begin communication, Alice sends Bob an instant message, for example from a client 30 through IP network 208. Agent 202 can respond to the instant message without the need for contacting Bob. For example, agent 202 can access PIM 218 to identify Alice as a contact for Bob and respond with an instant message that reads, "Hi Alice, how can I help you?" Alice can then indicate that the matter is urgent to agent 202. Within PIM 218, Bob lists Alice as having a high priority for communication messages. As a result, communication logic module 214 can contain rules to always route urgent messages from Alice directly to Bob. Agent 202 can then dial Bob's mobile phone as contained in PIM 218 and/or try other ways of contacting Bob to provide a bridge with a realtime communication connection between Bob and Alice. If the matter is not urgent, communication logic module 214, having access to PIM 218, can arrange a future meeting with Alice. For example, if Bob has an opening tomorrow at 2:00 p.m., a meeting can be arranged with Alice.

In another scenario, agent 202 can serve as an automatic attendant for a retail store. Brian calls Sandra's retail store using telephone 80. Agent 202 can generate a distinctive ring tone for the retail store's phone based on Brian's caller identification. Alternatively, if the caller identification is unavailable, agent 202 can conduct a dialog with Brian to obtain information about Brian. If Sandra is busy with a customer, agent 202 can answer Brian's call and conduct a dialog for simple questions that Brian may have, for example those related to directions, store hours and a web site universal resource locator (URL). Additionally, agent 202 can search within PIM 218 for information related to Brian.

As discussed above, agent 202 can serve as a communication handler for a group of users, in this case a family. The family's residence is in Seattle, Wash. while Susan (a member of the family) is attending school in Cambridge, England. One implementation of agent 202 can be at the home in Seattle while another implementation of an agent (herein agent 207) can be at Susan's room in Cambridge. Using a telephone 80 coupled to agent 207, Susan can provide a bridge from the agent 207 in Cambridge to the agent 202 in Seattle. Thus, a phone call can be conducted between the agents in Seattle and Cambridge through the Internet, wherein no long-distance charges are incurred. Additionally, Susan's friends can call to her room in Cambridge using agent 202 in Seattle. For example, one of Susan's friends can call agent 202 in Seattle. The agent 202 in Seattle can recognize the caller identification and automatically route the call to the agent 207 in Cambridge. Thus, Susan's friend can conduct a conversation between Seattle and Cambridge without the need for incurring long-distance charges.

Agent 202 can also provide a semantic interface in order to take a message from a person and develop a semantic structure for the message. Agent 202 can conduct a dialog in which a caller is asked semantic questions and utilize semantic-specific language models within natural language processing unit 216 to transcribe a voice message and summarize the voice mail message with relevant information. For example, agent 202 can ask the caller a number of key questions so that voice mail messages are divided into relevant segments. The segments can be better transcribed using a semantic-specific language model that improves recognition accuracy of the segments of the voice mail message.

When a user is busy and a message needs to be taken, agent 202 can ask the caller, "What is your call back number?" An answer from the caller after the question can be transcribed using a telephone number-specific language model and a tag can be added to the answer as corresponding to the call back number. Furthermore, agent 202 can ask, "What is the best time to call you?" A date/time specific language model can be used to recognize the answer. As a result, a more useable and efficient structured voice mail message transcription can result. The transcribed voice mail message can be sent as an email to a user or a group of users associated with agent 202. The email can include information related to the semantic structure of the voice mail message as well as a link to an audio file of the voice mail message.

Although the present invention has been described with reference to particular embodiments, workers skilled in the art will recognize that changes may be made in form and detail without departing from the spirit and scope of the invention.

What is claimed is:

1. A method of handling communication messages in a communication architecture, with a computer having a processor, comprising:
    receiving a communication message including natural language text from an initiator;
    analyzing the natural language text in the communication message to identify semantic information contained therein, the semantic information corresponding to a meaning of the natural language text; and
    automatically performing, with the processor, one or more tasks based on the communication message and the semantic information, wherein the one or more tasks include identifying and determining a priority setting for the communication message based on an identity of the initiator, the priority setting corresponding to one of a plurality of sets of rules indicating circumstances of a user, at a destination, under which communication messages are to be routed to the destination, and routing the communication message to the destination based on the set of rules corresponding to the priority setting and the circumstances of the user, the circumstances of the user indicating user availability to incoming communication messages;
    wherein, when the circumstances of the user indicate the user is unavailable, then conducting a dialog with the initiator to identify the initiator based on the semantic information and to obtain callback information for the initiator, wherein the communication message is a voicemail message and the one or more tasks include transcribing the voicemail message;
    presenting a structured representation of the voicemail message in a table that includes visual fields containing information, the information including a transcription of the voicemail message, a transcribed call back number from the callback information of the initiator obtained through the dialog with the initiator, a transcribed name of the initiator and each visual field including a corresponding hyper link from the visual field to a spot in an audio file of the voice mail message that was transcribed to derive the information in the visual field corresponding to the hyper link;
    wherein the priority setting corresponding to the plurality of sets of rules indicating circumstances of the user further comprises a high priority setting, a medium priority setting and a low priority setting;
    wherein performing one or more tasks includes accessing the plurality of sets of rules that include a high priority set of rules, corresponding to an initiator having an identity with a high priority setting, indicating that the communication message is to be routed to the user immediately, regardless of whether the user is busy;
    wherein performing one or more tasks includes accessing the plurality of sets of rules that include a medium priority set of rules, corresponding to an initiator having an identity with a medium priority setting, that indicates that a notification that the communication message has been received is sent to the user, if the user is busy;
    wherein performing one or more tasks includes accessing the plurality of sets of rules that include a low priority set of rules, corresponding to an initiator having an identity with a low priority setting, that the communication messages is only to be stored for later access by the user.

2. The method of claim 1 wherein identifying the initiator includes receiving a caller identification.

3. The method of claim 1 wherein the one or more tasks include performing speech recognition on the communication message.

4. The method of claim 1 wherein the one or more tasks include scheduling an event in a calendar.

5. The method of claim 1 wherein the one or more tasks include identifying if the communication message has been designated as urgent by the initiator based on the semantic information.

6. The method of claim 1 wherein the natural language text includes a date and a time.

7. The method of claim 1 wherein the one or more tasks include routing the communication message to the destination out of a plurality of different destinations.

8. The method of claim 7 wherein the one or more tasks include accessing a presence manager to determine the user availability.

9. A computer-implemented method of handling communication messages in a communication architecture, comprising:

receiving a communication message including natural language text from an initiator;

analyzing the natural language text in the communication message to identify semantic information contained therein, the semantic information corresponding to a meaning of the natural language text; and automatically performing, with the processor, one or more tasks based on the communication message and the semantic information, wherein the one or more tasks include identifying and determining a priority setting for the communication message based on an identity of the initiator, the priority setting corresponding to one of a plurality of sets of rules indicating circumstances of a user, at a destination, under which communication messages are to be routed to the destination, and routing the communication message to the destination based on the set of rules corresponding to the priority setting and the circumstances of the user, the circumstances of the user indicating user availability to incoming communication messages;

wherein, when the circumstances of the user indicate the user is unavailable, then conducting a dialog with the initiator to identify the initiator based on the semantic information and to obtain callback information for the initiator, wherein the communication message is a voicemail message and the one or more tasks include transcribing the voice mail message; and presenting a structured representation of the voicemail message in a table that includes visual fields containing information, the information including a transcription of the voicemail message, a transcribed call back number from the callback information of the initiator obtained through the dialog with the initiator, a transcribed name of the initiator and each visual field including a corresponding hyper link from the visual field to a spot in an audio file of the voice mail message that was transcribed to derive the information in the visual field corresponding to the hyper link;

wherein the priority setting corresponding to the plurality of sets of rules indicating circumstances of the user further comprises a high priority setting, a medium priority setting and a low priority setting;

wherein performing one or more tasks includes accessing the plurality of sets of rules that include a high priority set of rules, corresponding to an initiator having an identity with a high priority setting, indicating that the communication message is to be routed to the user immediately, regardless of whether the user is busy;

wherein performing one or more tasks includes accessing the plurality of sets of rules that include a medium priority set of rules, corresponding to an initiator having an identity with a medium priority setting, that indicates that a notification that the communication message has been received is sent to the user, if the user is busy;

wherein performing one or more tasks includes accessing the plurality of sets of rules that include a low priority set of rules, corresponding to an initiator having an identity with a low priority setting, that indicates that the communication message is only to be stored for later access by the user.

10. The method of claim 9 and wherein presenting to the user a structured representation further comprises presenting a textual transcription of the voicemail message.

* * * * *